(12) United States Patent
Ogawa

(10) Patent No.: US 9,930,206 B2
(45) Date of Patent: Mar. 27, 2018

(54) IMAGE FORMING APPARATUS WITH COPY FUNCTION THAT PRINTS IMAGE DATA READ FROM MANUSCRIPTS ON PRINTING PAPER ACCORDING TO SET PRINTING CONDITIONS

(71) Applicant: KYOCERA Document Solutions Inc., Osaka (JP)

(72) Inventor: Tomohiro Ogawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/449,942

(22) Filed: Mar. 4, 2017

(65) Prior Publication Data

US 2017/0257512 A1   Sep. 7, 2017

(30) Foreign Application Priority Data

Mar. 4, 2016   (JP) ................ 2016-042088

(51) Int. Cl.
| | |
|---|---|
| H04N 1/04 | (2006.01) |
| H04N 1/10 | (2006.01) |
| G06K 15/02 | (2006.01) |
| H04N 1/00 | (2006.01) |
| H04N 1/12 | (2006.01) |

(52) U.S. Cl.
CPC ............. *H04N 1/10* (2013.01); *G06K 15/02* (2013.01); *H04N 1/00331* (2013.01); *H04N 1/00795* (2013.01); *H04N 1/121* (2013.01); *H04N 2201/0082* (2013.01)

(58) Field of Classification Search
CPC .. G06F 3/04883; G06F 17/21; G06F 3/03545; G06K 9/222; G06K 2009/226; G06K 9/00409; G06K 9/00429; G06K 9/228; F02B 2075/025; G09B 5/065; H02J 7/0003; H02J 7/045; Y02B 60/1253
USPC ........ 715/273, 863; 382/186, 189, 203, 216, 382/218, 313, 315, 324; 320/133; 345/173

See application file for complete search history.

(56) References Cited

U.S. PATENT DOCUMENTS 5,157,737 A * 10/1992 Sklarew .................. G06F 3/033
                                                              345/173
5,425,138 A *  6/1995 Kumakawa ........... G06F 17/211
                                                              715/223

(Continued)

FOREIGN PATENT DOCUMENTS

JP          2007-324840 A     12/2007

*Primary Examiner* — Negussie Worku
(74) *Attorney, Agent, or Firm* — Hawaii Patent Services; Nathaniel K. Fedde; Kenton N. Fedde

(57) ABSTRACT

Provided is an image forming apparatus that can accurately determine whether a manuscript is pencil writing. The image forming apparatus is a copier with a copy function that, after receiving a copy instruction, reads image data from a manuscript, and prints the read image data on printing paper according to set printing conditions. The copier includes a character extracting unit and a line width judgment unit. The character extracting unit extracts characters from each of a plurality of different locations in image data. The line width judgment unit determines whether or not a manuscript is pencil writing by comparing line widths of the characters that were extracted by the character extracting unit.

7 Claims, 7 Drawing Sheets

(56) References Cited

U.S. PATENT DOCUMENTS

| | | | | |
|---|---|---|---|---|
| 5,590,257 | A * | 12/1996 | Forcier | G06F 3/0488 |
| | | | | 715/273 |
| 6,434,581 | B1 * | 8/2002 | Forcier | G06F 3/0488 |
| | | | | 715/273 |
| 6,965,703 | B1 * | 11/2005 | Regev | G06K 9/228 |
| | | | | 358/3.26 |
| 2002/0076098 | A1 * | 6/2002 | Love | G06K 9/00 |
| | | | | 382/154 |
| 2002/0095444 | A1 * | 7/2002 | Mantaro | G06F 17/211 |
| | | | | 715/209 |
| 2004/0021700 | A1 * | 2/2004 | Iwema | G06K 9/00436 |
| | | | | 715/863 |
| 2004/0093565 | A1 * | 5/2004 | Bernstein | G06F 17/242 |
| | | | | 715/268 |
| 2006/0187477 | A1 * | 8/2006 | Maki | G06T 11/60 |
| | | | | 358/1.9 |
| 2010/0033741 | A1 * | 2/2010 | Kido | H04N 1/00363 |
| | | | | 358/1.9 |
| 2012/0099147 | A1 * | 4/2012 | Tanaka | G06F 3/1206 |
| | | | | 358/1.15 |
| 2012/0250989 | A1 * | 10/2012 | Asano | G06K 9/348 |
| | | | | 382/165 |
| 2014/0168716 | A1 * | 6/2014 | King | H04N 1/32101 |
| | | | | 358/473 |

* cited by examiner

IMAGE FORMING APPARATUS WITH COPY FUNCTION THAT PRINTS IMAGE DATA READ FROM MANUSCRIPTS ON PRINTING PAPER ACCORDING TO SET PRINTING CONDITIONS

INCORPORATION BY REFERENCE

This application is based on and claims the benefit of priority from Japanese Patent Application No. 2016-042088 filed on Mar. 4, 2016, the contents of which are hereby incorporated by reference.

BACKGROUND

The present disclosure relates to an image forming apparatus with a copy function that prints image data read from a manuscript on printing paper according to set printing conditions.

At school, notes and the like are generally written using a pencil, however, when using an image forming apparatus to copy a manuscript that has been written with a pencil, the writing may be thin and unreadable. By performing image processing (density change, sharpness) for pencil writing it is possible to make an easy-to-read copy of a manuscript written in pencil, however, copying may be performed inadvertently without remembering to set this image processing. Therefore, technology has been proposed that determines whether or not an image written on a manuscript is written in pencil, and when it is determined there is pencil writing, displays a warning and inquires whether or not it is necessary to change the density setting for the image.

SUMMARY

The image forming apparatus of the present disclosure has a copy function that, after receiving a copy instruction, reads image data from a manuscript, and prints the read image data on printing paper according to set printing conditions. The image forming apparatus includes a character extracting unit that extracts characters from each of a plurality of different locations in the image data, and a line width judgment unit that determines whether or not the manuscript is pencil writing by comparing line widths of the characters that were extracted by the character extracting unit.

DETAILED DESCRIPTION

Next, embodiments of the present disclosure will be explained in detail with reference to the drawings.

First Embodiment

Figure 1:
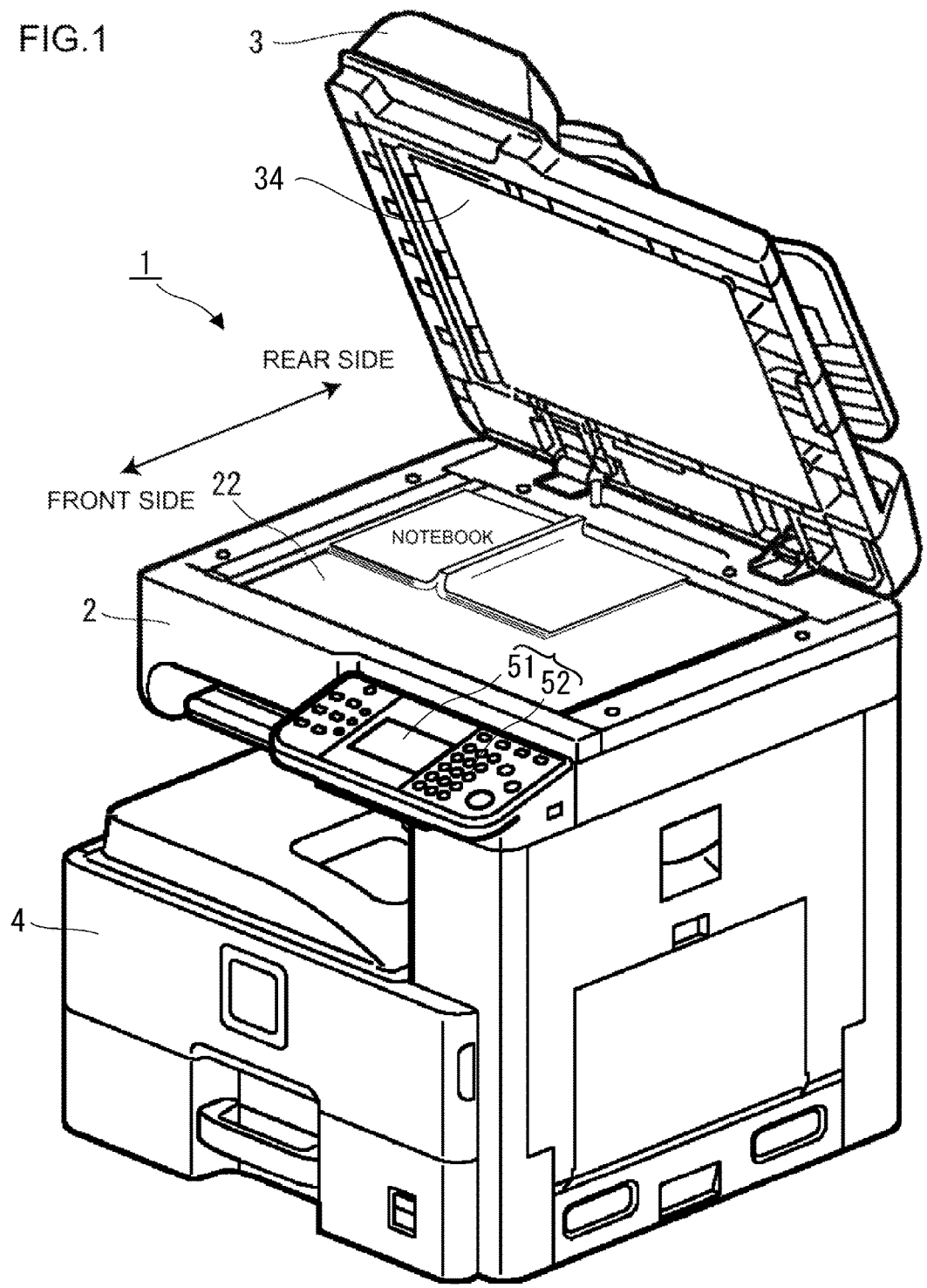
FIG. 1 is an external perspective view illustrating the configuration of a first embodiment of an image forming apparatus of the present disclosure.
Figure 2:
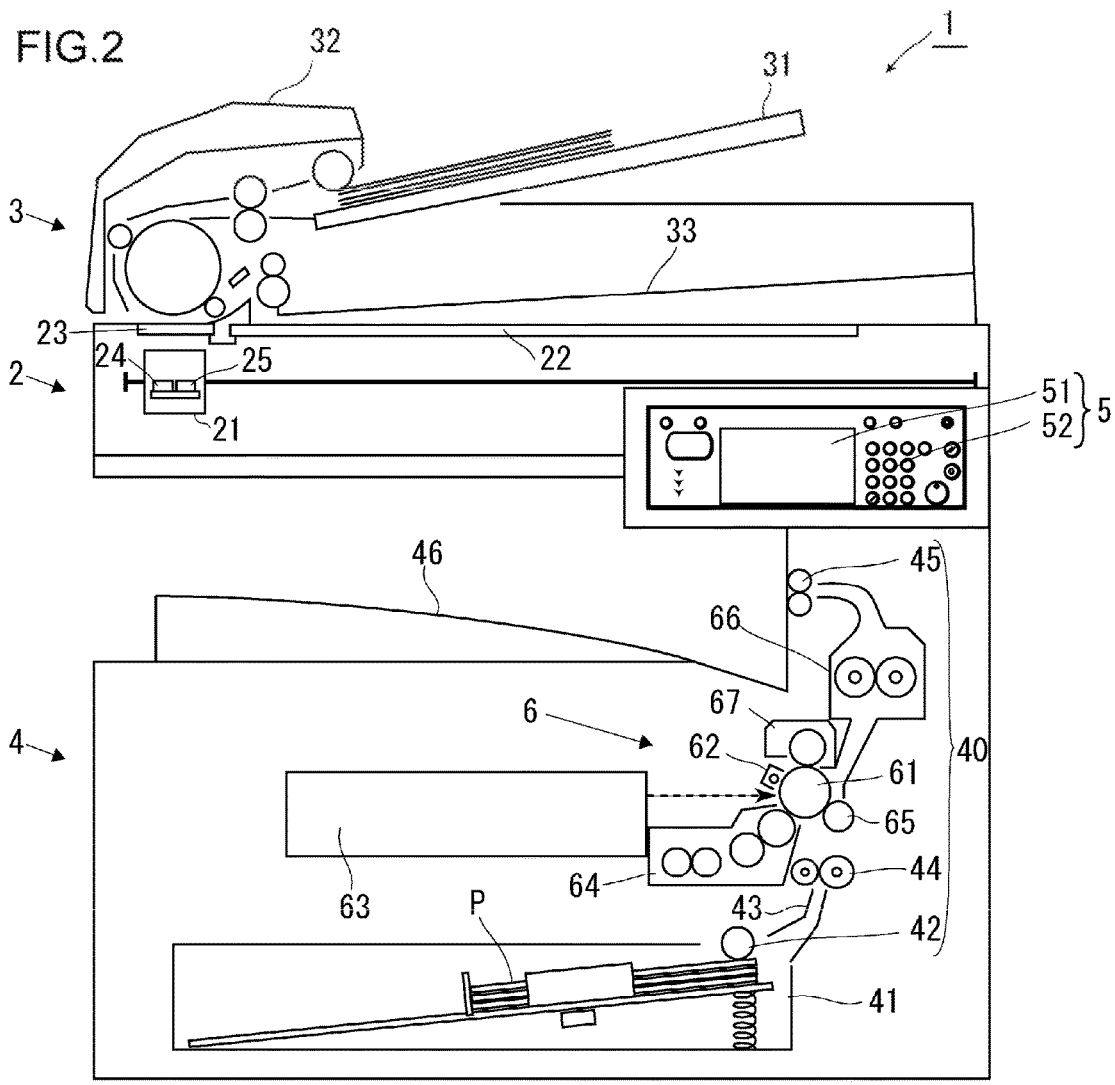
FIG. 2 is a cross-sectional schematic view illustrating the internal configuration of a first embodiment of an image forming apparatus of the present disclosure.

The image forming apparatus of a first embodiment is a copier 1, and referring to FIG. 1 and FIG. 2, includes a manuscript reader 2, a manuscript feeder 3, a main unit 4 and an operation unit 5. The manuscript reader 2 is arranged on the upper portion of the main unit 4, and the manuscript feeder 3 is arranged on the upper portion of the manuscript reader 2. The operation unit 5 is arranged on the front side of the copier 1. Moreover, the manuscript feeder 3 and manuscript reader 2 are connected by a hinge mechanism on the rear side of the copier 1, and configuration is such that by opening up the manuscript feeder 3 from the front side, it is possible to open the platen glass 22 on the top surface of the manuscript reader 2. FIG. 1 illustrates a state in which the manuscript feeder 3 is open wide. This image forming apparatus was explained as being a copier 1, however, needless to say, could also be a scanner, a multifunction machine and the like.

The operation unit 5 that performs settings and operation instructions is arranged on the front side of the copier 1. The operation unit 5 is provided with a liquid-crystal display 51 and operation buttons 52. By operating the operation unit 5 and inputting instructions, a user performs various settings of the copier 1, and causes the copier 1 to execute various functions such as image formation. The liquid-crystal display 51 displays the state of the copier 1, displays the image formation status and number of copies, and as a touch panel is able to perform various settings such as a manuscript size setting, function settings such as both-side printing or black and white reversal, a magnification rate setting, a density setting and the like. As operation buttons 52, a start button for the user to give an instruction to start image formation, a stop/clear button used when interrupting image formation, a reset button used when setting the various settings of the copier 1 to the default state, ten-key and the like are provided.

Referring to FIG. 2, the manuscript reader 2 includes a scanner 21, a platen glass 22, and a manuscript reading slit 23. The scanner 21 includes a light source 24 that uses an LED (Light Emitting Diode), a light receiver 25 that includes a CCD (Charge Coupled Device) line sensor, CMOS (Complementary Metal Oxide Semiconductor) line sensor or the like, and is configured so as to be able to move in the convenyance direction that the manuscript feeder 3 conveys the manuscript. The platen glass 22 is a manuscript holder that is arranged on the top surface of the manuscript reader 2 and is made using a rectangular shaped transparent member such as glass. The manuscript reading slit 23 is a slit that is formed in a direction orthogonal to the convenyance direction that the manuscript feeder 3 conveys the manuscript.

The manuscript feeder 3 includes a manuscript placement unit 31, a manuscript output unit 32, and a manuscript conveying mechanism 33. Manuscript that is placed on the manuscript placement unit 31 is fed out one sheet at a time by the manuscript conveying mechanism 33 and conveyed to a position that faces the manuscript reading slit 23, and then is output to the manuscript output unit 32.

The manuscript feeder 3 functions as a platen cover that opens and closes the top surface of the platen glass 22, and by opening up the manuscript feeder 3 the top surface of the platen glass 22 is opened and it is possible to set a manuscript on the platen glass 22. Moreover, the surface of the manuscript feeder 3 that faces the platen glass 22 is a white manuscript constraining surface 34.

When a manuscript is not placed on the manuscript placement unit 31, or when the manuscript feeder 3 (platen cover) is open and an instruction is given by using the operation buttons 52 of the operation unit 5 to read a manuscript, a manuscript that is placed on the platen glass 22 is read. When reading a manuscript that is placed on the platen glass 22, the scanner 21 is moved to a position that faces the platen glass 22, and then acquires image data by reading while scanning the manuscript that is placed on the platen glass in a sub scanning direction that is orthogonal to the main scanning direction, and outputs the acquired image data to the main unit 4.

When a manuscript is placed on the manuscript placement unit 31 and the operation buttons 52 of the operation unit 5 are used to give an instruction to read the manuscript, the manuscript is conveyed by the manuscript feeder 3 and read. When reading the manuscript that was conveyed by the manuscript feeder 3, the scanner 21 is moved to a position that faces the manuscript reading slit 23, and then acquires image data by reading the manuscript by way of the manuscript reading slit 23 in synchronization with the conveyance operation of the manuscript by the manuscript feeder 3, and outputs the acquired image data to the main unit 4.

The main unit 4, together with including a printing unit 6, includes a paper feeding unit 41, and paper feeding roller 42, a paper conveying path 43, a conveying roller 44, and an output roller 45. The paper feeding unit 41 is a paper feeding cassette in which a plurality of sheets of printing paper P are stored. The paper feeding roller 42 feeds printing paper P one sheet at a time from the paper feeding unit 41 to the paper conveying path 43. Printing paper P that has been fed out to the paper conveying path 43 by the paper feeding roller 42 is conveyed to the printing unit 6 by the conveying roller 44. Then, printing paper P on which printing was performed by the printing unit 6 is outputted to an output space 46 that is formed between the manuscript reader 2 and the main unit 4. In this way, the paper feeding roller 42, the conveying roller 44 and the output roller 45 function as a conveying unit 40 for the printing paper P.

The printing unit 6 includes a photosensitive drum 61, a charging unit 62, an exposing unit 63, an image forming unit 64, a transferring unit 65, a fixing unit 66 and a cleaning unit 67. The exposing unit 63 is an optical unit that includes a laser device, mirrors and the like, and outputs laser light based on the image data and exposes the photosensitive drum 61 that has been charged with uniformity by the charging unit 62, and forms an electrostatic latent image on the surface of the photosensitive drum 61. The image forming unit 64 is a developing unit that uses toner to develop the electrostatic latent image that was formed on the photosensitive drum 61, and causes a toner image to be formed on the photosensitive drum 61 based on the electrostatic latent image. The transferring unit 65 causes the toner image that was formed on the photosensitive drum 61 by the image forming unit 64 to be transferred to printing paper P. The fixing unit 66 heats the printing paper P on which the toner image was transferred by the transferring unit 65 and fixes the toner image on the printing paper P. Then, the cleaning unit 67 removes the toner that remains on the photosensitive drum 61.

Figure 3:
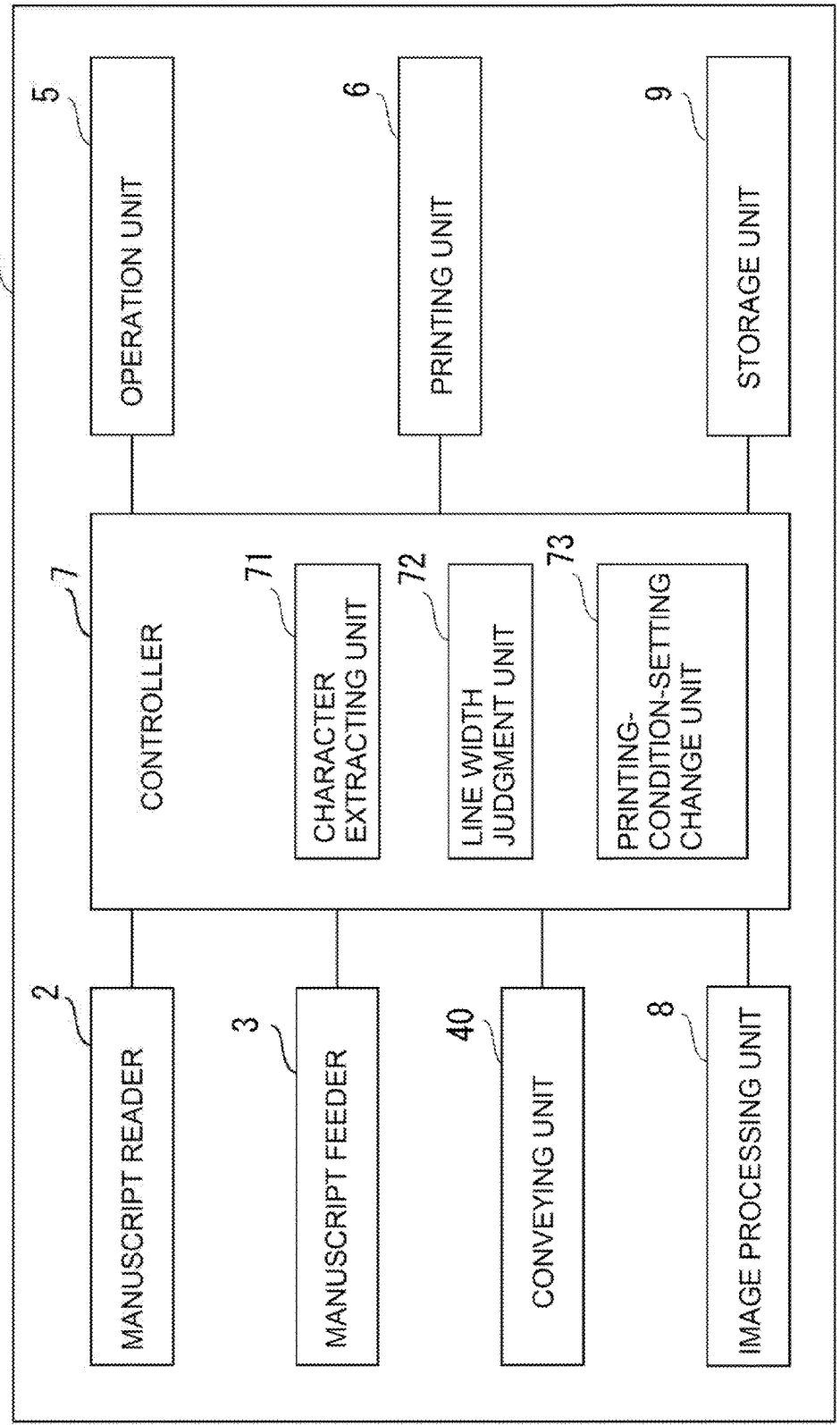
FIG. 3 is a block diagram illustrating an overview of the configuration of the copier illustrated in FIG. 1 and FIG. 2.

FIG. 3 is a block diagram that illustrates an overview of the configuration of the copier 1. The aforementioned manuscript reader 2, the manuscript feeder 3, conveying unit (paper feeding roller 42, conveying roller 44, output roller 45), operation unit 5 and printing unit 6 are connected to a controller 7, and the operation is controlled by the controller 7. An image processing unit 8 and a storage unit 9 are also connected to the controller 7.

The controller 7 is an information processing unit such as a microcomputer that includes ROM (Read Only Memory), RAM (Random Access Memory) and the like. A control program for performing operation control of the copier 1 is stored in ROM. The controller 7 reads the control program that is stored in ROM, and by expanding the control program in RAM, performs control of the entire apparatus and functions as a character extracting unit 71, a line width judgment unit 72 and a printing-condition-setting change unit 73.

The image processing unit 8 is means for performing image processing on image data; for example, enlargement or reduction processing, gradation adjustment, density adjustment and the like, and has a function for performing image processing (changing density and sharpness) for pencil writing.

The storage unit 9 is storage means such as a semiconductor memory, HDD (Hard Disk Drive) and the like, and together with storing image data that was acquired by the manuscript reader 2 reading a manuscript, stores various kinds of management information.

Figure 4:
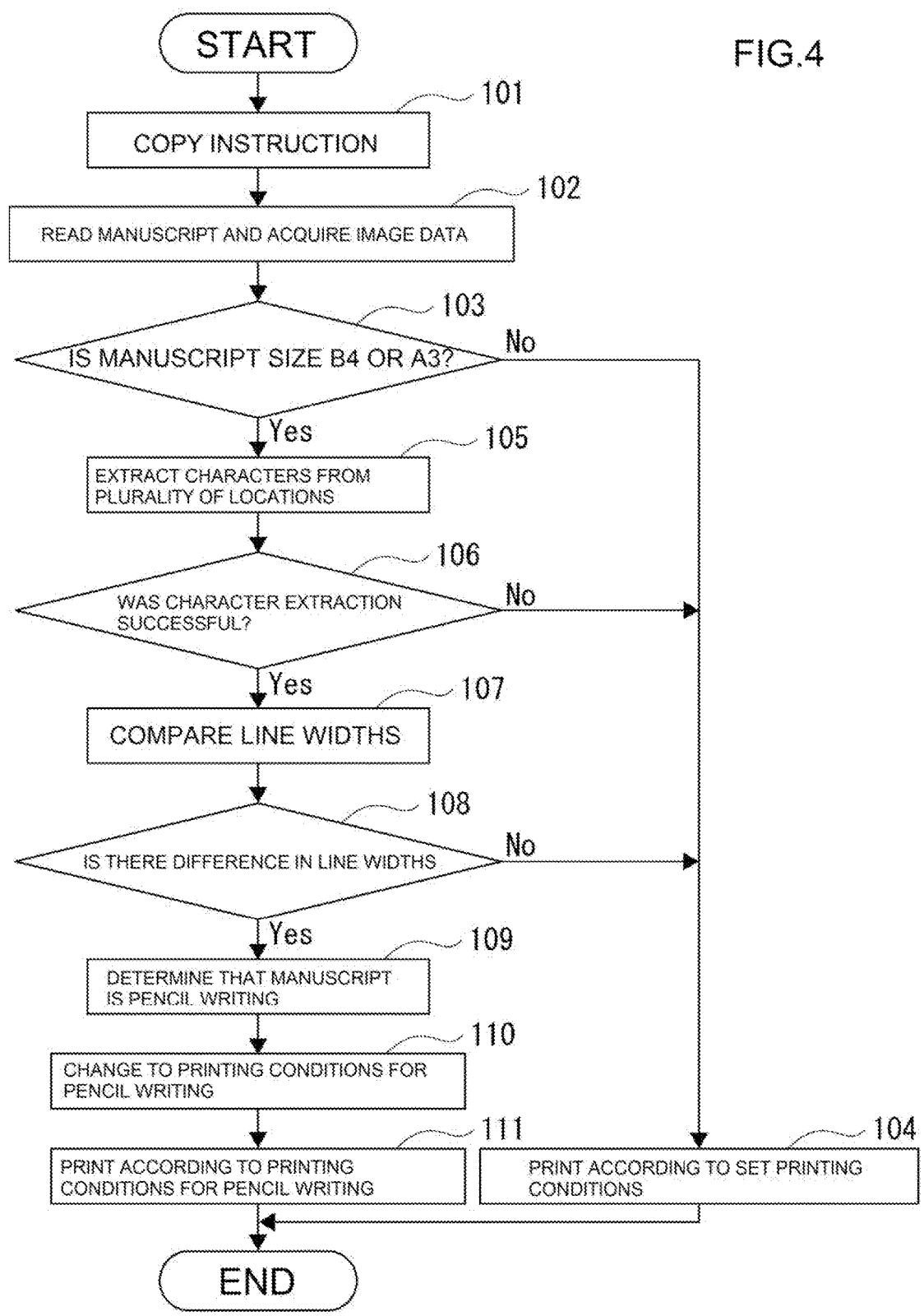
FIG. 4 is a flowchart illustrating a pencil writing manuscript judgment operation of the copier illustrated in FIG. 1 and FIG. 2.
Figure 5:
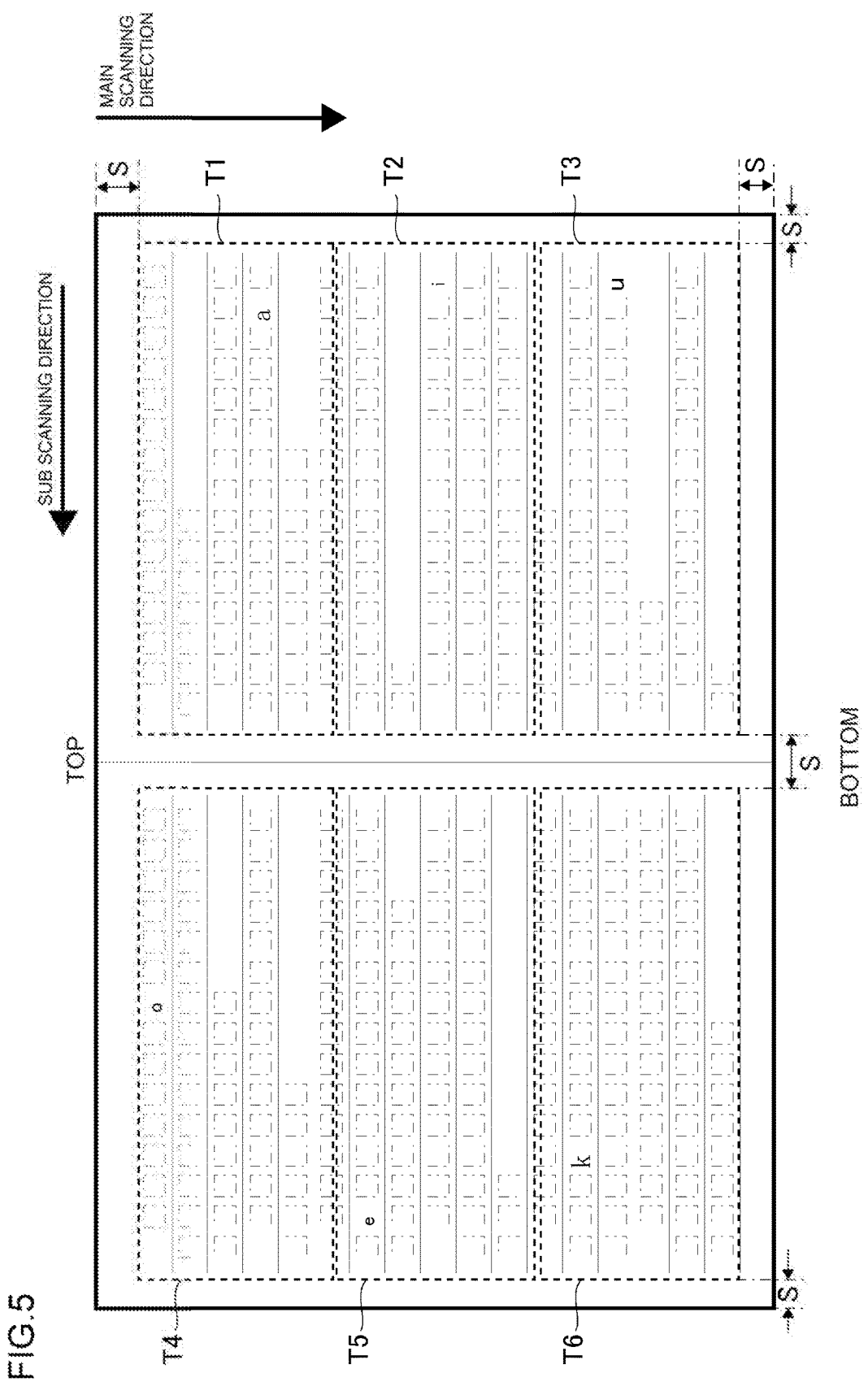
FIG. 5 is a figure explaining a character extraction operation by the character extracting unit illustrated in FIG. 3.

Next, a pencil manuscript judgment operation of the copier 1 of a first embodiment will be explained in detail with reference to FIG. 4 and FIG. 5.

When the controller 7 receives a copy instruction that was given by using the operation buttons 52 of the operation unit 5 (step 101), the controller 7 acquires image data by the manuscript reader 2 reading a manuscript based on the manuscript size that was set by a user (step 102).

Next, the controller 7 determines whether or not the manuscript size that is set by the user is B4 or A3 (step 103). The copier 1 can also be configured so as to automatically determined the manuscript size by performing a pre-scan.

In step 103, when the manuscript size is not B4 or A3, the controller 7 does not execute the pencil manuscript judgment operation, and using the printing unit 6 prints the image data that was acquired in step 102 on printing paper P according to initial settings or according to printing conditions that were set by the user (step 104), then ends the copy operation.

In step 103, when the manuscript size is B4 or A3, the controller 7 functions as a character extracting unit 71 in order to execute the pencil manuscript judgment operation. In other words, the controller 7 uses a specified manuscript size as a trigger for executing the pencil manuscript judgment operation. The sizes of typical notebooks having a high possibility of being written in pencil are sizes B5 and A4. Therefore, the pencil manuscript judgment operation is performed for sizes B4 and A3, which are the sizes when a typical notebook is spread open.

The character extracting unit 71 performs an OCR (Optical character recognition) process on the image data that was acquired in step 102, and extracts characters from a plurality of different locations, respectively (step 105). In this embodiment, as illustrated in FIG. 5, the character extracting unit 71 divides the area other than the margins S on the top, bottom, left and right sides and gutter section into six character extraction areas T1 to T6, then performs an OCR process on each of the character extraction areas T1 to T6, and extracts characters having the same set character type and color (for example, black), respectively. The character type of the characters extracted can be set to one type among hiragana, katakana, alphanumeric characters, and numbers having few strokes. The character type of the characters extracted can also be set to multiple types among hiragana, katakana, alphanumeric characters, and numbers having few strokes. The OCP process does not need to be performed for the entire area of each character extraction area, and by ending the OCR process at the instant that one character has been extracted from each area, it is possible to reduce the processing cost, which is preferred.

Next, the character extracting unit 71 determines whether or not extraction of characters from two or more locations inside the character extraction areas T1 to T6 was successful (step 106). When characters could not be extracted from two or more locations inside the character extraction areas T1 to T6 in step 106, the character extracting unit 71 ends the pencil manuscript judgment operation, after which processing advances to step 104 and the controller 7, using the printing unit 6, prints the image data that was acquired in step 102 on printing paper P according to initial settings or according to printing conditions that were set by the user, then ends the copy operation.

In step 106, when extraction of characters from two or more locations inside the character extraction areas T1 to T6 is successful, the controller 7 functions as a line width judgment unit 72 and finds the line width (thickness) of each of the extracted characters, then compares each of the line widths (step 107). The line width of a character can be found, for example, as the average line width by finding the total number of black pixels and the total contour length, and calculating [(total number of black pixels)×2]/(total contour length)].

Next, the line width judgment unit 72 determines whether or not there is any difference in the line widths of the extracted characters (step 108). The line width judgment unit 72 determines that there is difference in the line widths (thicknesses) of the extracted characters when the difference between the thickest line width among the extracted characters and narrowest line width among the extracted characters is equal to or greater than a preset threshold value. In other words, in the case of pencil writing, the line width of the characters gradually becomes thicker as the pencil lead is reduced while writing, so by taking advantage of this characteristic, determining whether a manuscript is pencil writing or not is performed by comparing the line widths of characters that have been extracted from different locations.

When there is no difference in the line widths of the characters extracted in step 107, the line width judgment unit 72 ends the line width manuscript judgment operation, after which processing advances to step 104 and the controller 7, using the printing unit 6, prints the image data that was acquired in step 102 on printing paper P according to initial settings or according to printing conditions that were set by the user, then ends the copy operation.

When there is difference in the line widths of the characters extracted in step 107, the line width judgment unit 72 determines that the manuscript is pencil writing (step 109). When it is determined that the manuscript is pencil writing, the controller 7 functions as a printing-condition-setting change unit 73, and changes the settings to the printing conditions for pencil writing for performing image processing (density change or sharpness) for pencil writing (step 110). Then, the controller 7, using the printing unit 6, prints the image data that was acquired in step 102 on printing paper P according to the changed pencil writing printing conditions (step 111).

This first embodiment as explained above is a copier 1 that includes a copy function that after receiving a copy instruction, reads image data from a manuscript and prints the read image data on printing paper P according to set printing conditions. The copier 1 also includes a character extracting unit 71 that extracts characters from each of a plurality of different locations of image data, and a line width judgment unit 72 that determines whether or not a manuscript is pencil writing by comparing the line widths of the characters that were extracted by the character extracting unit 71.

With this kind of configuration, in the case of pencil writing, it is possible to more accurately determine a pencil writing manuscript by taking advantage of the characteristic that the line widths of characters gradually become thicker as the pencil lead is reduced while writing. For example, when it can be determined that a manuscript is a pencil writing manuscript, the user can be notified of that, and the user can be prompted to change the printing conditions to conditions for pencil writing.

Furthermore, according to this first embodiment, the character extracting unit 71 is configured so as to extract characters having the same color from each of a plurality of different locations in the image data.

With this configuration, it is possible to compare line widths of characters written using the same pencil or the same type of pencil, and it is possible to accurately determine a pencil writing manuscript.

Furthermore, according to this first embodiment, the character extracting unit 71 is configured so as to extract characters of the same character type from each of a plurality of different locations in the image data.

With this configuration, it is possible to accurately compare line widths.

Moreover, according to this first embodiment, there is a printing-condition-setting change unit 73 that changes the printing conditions to pencil writing printing conditions for performing image processing for pencil writing when the line width judgment unit 72 determines that a manuscript is pencil writing, and prints image data on printing paper P according to the changed pencil writing printing conditions.

With this configuration, a user can perform copying without having to consider whether or not a manuscript is pencil writing, and this convenience is improved.

Furthermore, according to this first embodiment, the character extracting unit 71 is configured so as to extract characters from a each of a plurality of different locations in image data when the manuscript size of a manuscript is size B4 or size A3.

With this configuration, the pencil manuscript judgment operation is efficiently executed only when there is a high possibility of pencil writing.

Second Embodiment

Figure 6:
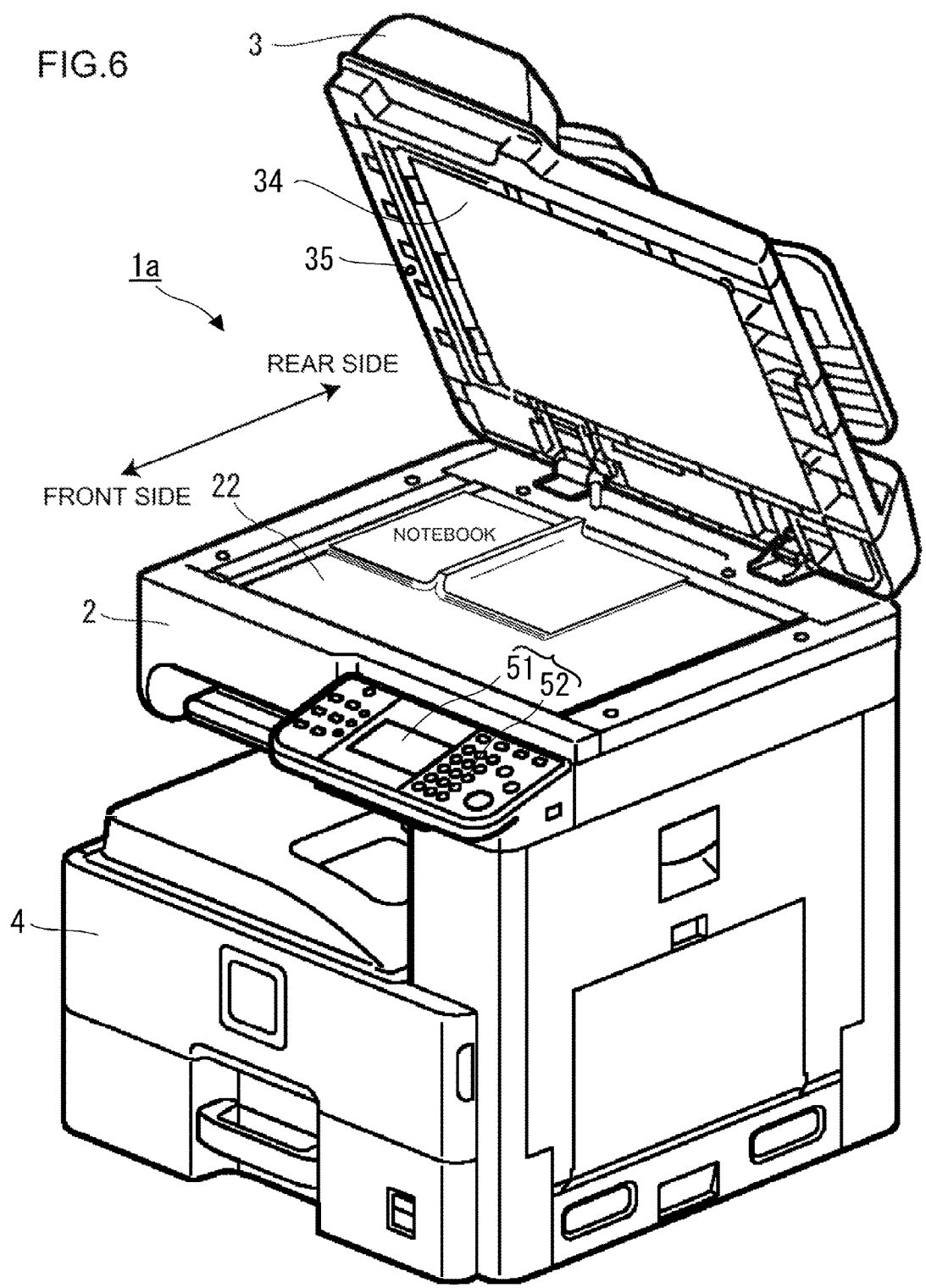
FIG. 6 is an external perspective view illustrating the configuration of a second embodiment of an image forming apparatus of the present disclosure.

The image forming apparatus of a second embodiment is a copier 1a, and referring to FIG. 6, in addition to the construction of the copier 1 of the first embodiment, an open/closed detecting sensor 35 is provided as an open/closed detecting unit that detects whether the manuscript feeder 3 (platen cover) is open or closed. The open/closed detecting sensor 35 is a microswitch that detects whether the manuscript feeder 3 (platen cover) is open or closed, and is turned ON when the manuscript feeder 3 (platen cover) is closed, and is turned OFF when the manuscript feeder 3 (platen cover) is open.

In the first embodiment, the controller 7 is configured so as to execute the pencil manuscript judgment operation using a specified manuscript size as a trigger, however, in the second embodiment, the controller 7 executes the pencil manuscript judgment operation using the open/closed state of the manuscript feeder 3 (platen cover) as a trigger.

Figure 7:
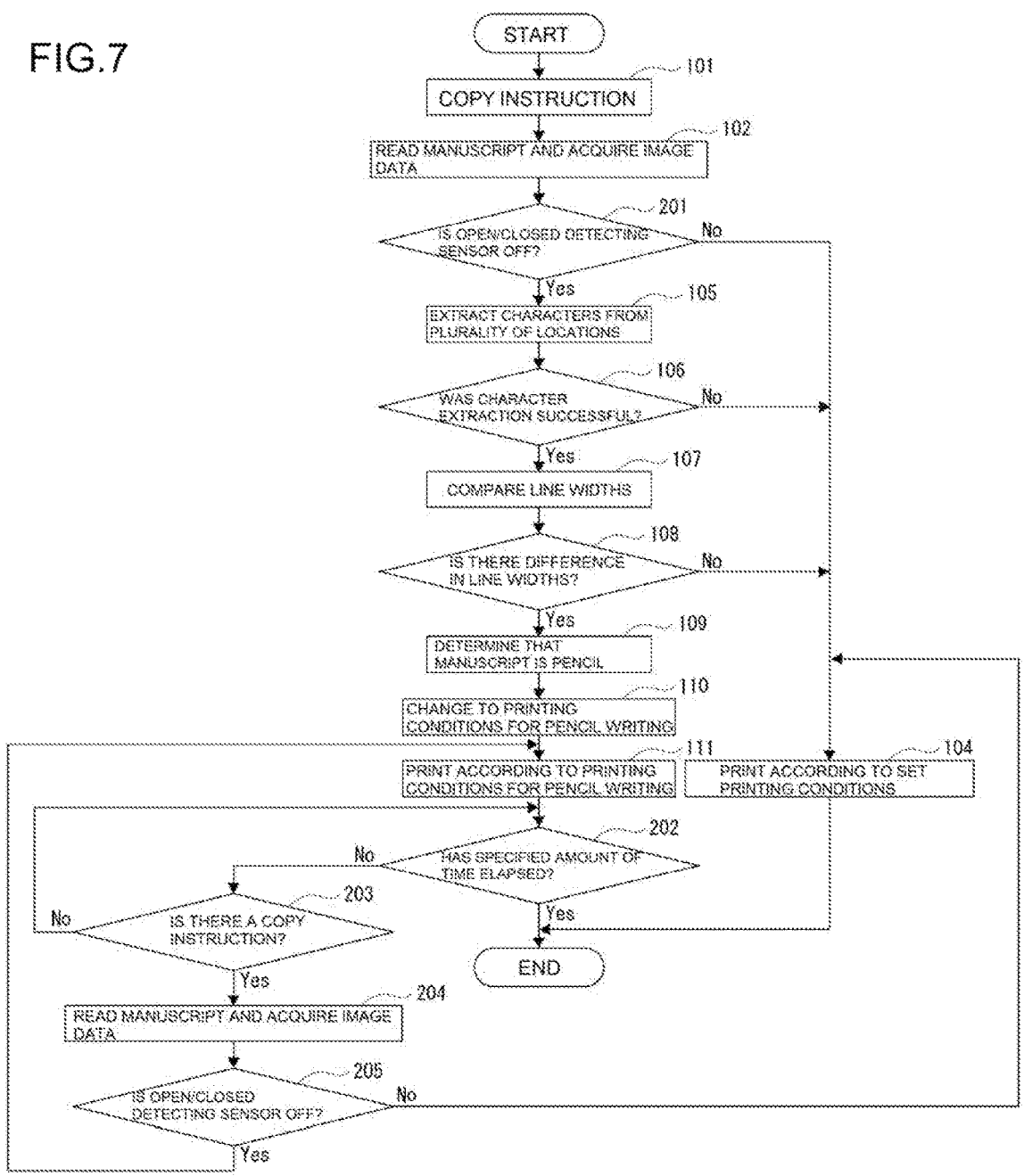
FIG. 7 is a flowchart illustrating a pencil writing manuscript judgment operation of the copier illustrated in FIG. 6.

Next, the pencil manuscript judgment operation of the copier 1a in the second embodiment will be explained in detail with reference to FIG. 7. The same reference numbers will be used for steps that are the same as in the first embodiment, and an explanation thereof will be omitted.

After image data has been acquired in step 102, the controller 7 determines whether or not the open/closed detecting sensor 35 is OFF (step 201).

In step 201, when the open/closed detecting sensor 35 is ON, the controller does not execute the pencil manuscript judgment operation, and using the printing unit 6, prints the image data that was acquired in step 102 on printing paper P according to initial settings, or according to printing conditions set by the user (step 104), then ends the copy operation.

In step 201, when the open/closed detecting sensor 35 is OFF, the controller 7 functions as the character extracting unit 71 in order to execute the pencil manuscript judgment operation. In other words, the controller 7 executes the pencil manuscript judgment operation using the open/closed state of the manuscript feeder 3 (platen cover) as a trigger. When copying a typical notebook of which the possibility of being written in pencil is high, the notebook is spread open and placed on the platen glass 22 as illustrated in FIG. 6. Consequently, a copy instruction is given in a state in which the manuscript feeder 3 (platen cover) cannot be completely closed. Therefore, in the second embodiment, the pencil manuscript judgment operation is performed when the open/closed detecting sensor 35 is OFF, indicating that the manuscript feeder 3 (platen cover) is open.

In step 111, when executing printing, the controller 7 waits for a preset specified amount of time to elapse (step 202), and waits to receive a copy instruction from the operation buttons 52 of the operation unit 5 (step 203). In step 112, after a specified amount of time has elapsed without receiving a copy instruction in step 113, the controller 7 ends the copy operation.

When a copy instruction is received in step 203 before a specified time has elapsed in step 202, the controller 7, based on the manuscript size that is set by the user, acquires image data by the manuscript reader 2 reading a manuscript (step 204), and determines whether or not the open/closed detecting sensor 35 is OFF (step 205). The specified amount of elapsed time in step 202 during which waiting is performed is set using the amount of time required to change the page of the notebook manuscript and set the manuscript again as a guide. Therefore, when a copy instruction is received in step 203 before the specified amount of time elapses in step 202, it can be presumed that copying of a notebook written in pencil will continue.

In step 205, when the open/closed detecting sensor 35 is ON, the controller 7 does not execute the pencil manuscript judgment operation, but determines that the manuscript is not pencil writing and, using the printing unit 6, prints the image data that was acquired in step 102 on printing paper P according to initial settings or according to printing conditions set by the user (step 104), then ends the copy operation.

In step 205, when the open/closed detecting sensor 35 is OFF, or in other words, when the manuscript feeder 3 (platen cover) is open when a copy instruction is received, the controller 7 does not execute the pencil manuscript judgment operation, but determines that the manuscript is pencil writing, advances to step 111, and using the printing unit 6, prints the image data that was acquired in step 102 on printing paper P according to the changed printing conditions for pencil writing.

The second embodiment as explained above is a copier 1a that includes a copy function that after a copy instruction is received, reads image data from a manuscript, and prints the read image data on printing paper P according to set printing conditions. The copier 1a includes a character extracting unit 71, a line width judgment unit 72, a platen glass 22, and a manuscript feeder 3 (platen cover). The character extracting unit 71 extracts characters from each of a plurality of different locations in image data. The line width judgment unit 72 determines whether or not a manuscript is pencil writing by comparing the line widths of the characters that were extracted by the character extracting unit 71. A manuscript is placed on the platen glass 22. The manuscript feeder 3 (platen cover) opens or closes the top surface of the platen glass 22. The open/closed detecting sensor 35 detects the open or closed state of the manuscript feeder 3 (platen cover). When a copy instruction has been received and the open/closed detecting sensor 35 detects that the manuscript feeder 3 (platen cover) is open, the character extracting unit 71 is configured to extract a characters from each of a plurality of different locations in the image data.

With this configuration, in the case of pencil writing, a characteristic that the line widths of characters gradually become thicker as a pencil lead is reduced while writing is taken advantage of, making it possible to more accurately determine a manuscript written in pencil, and only in the case when there is a high possibility of pencil writing, a pencil manuscript judgment operation may be efficiently executed.

Furthermore, according to the second embodiment, when the line width judgment unit 72 determines that a manuscript is pencil writing, there is a printing-condition-setting change unit 73 that changes to printing conditions for pencil writing for performing image processing for pencil writing, and prints image data on printing paper P according to the changed printing conditions for pencil writing. After image data has been printed on printing paper P according to the printing conditions for pencil writing, configuration is such that when a copy instruction is received before a preset specified time has elapsed and the open/closed detecting sensor 35 detects that the manuscript feeder 3 (platen cover) is open when the copy instruction was received, the character extraction operation by the character extracting unit 71 and the line width judgment operation by the line width judgment unit 72 are not executed, and printing-condition-setting change unit 73 executes a printing operation according to the printing conditions for pencil writing.

With this configuration, when it can be presumed that a manuscript is pencil writing, it is possible to efficiently execute a printing operation according to printing conditions for pencil writing without executing a pencil manuscript judgment operation.

In typical technology, an attempt to detect pencil writing is performed according to characteristics such as luminance and brightness, however, there was a problem in that it was not always possible to accurately detect pencil writing by just the characteristics of luminance and brightness.

Taking into consideration the problem above, the object of the present disclosure is to provide an image forming apparatus that is able to solve the problem with typical technology, and can more accurately determine a pencil written manuscript.

According to the present disclosure, in the case of pencil writing, there is an effect of being able to more accurately determine a pencil written manuscript by taking advantage of the characteristic that the line widths of characters gradually become thicker as a pencil lead is reduced while writing.

The present disclosure is not limited to the embodiments described above, and clearly the embodiments can be appropriately changed within the range of the technical scope of the present disclosure. Moreover, the number, position, shape and the like of the components described above are not limited to the embodiments above, and when embodying the present disclosure it to use a suitable number, position, shape and the like. In the figures, the same reference numbers are used for component elements that are the same.

What is claimed is:

1. An image forming apparatus comprising:
a manuscript reader that reads image data from a manuscript
a printing unit that prints the image data read by the manuscript reader on printing paper according to set printing conditions, and
a controller that controls the manuscript reader and the printing unit, wherein
the controller functions as:
a character extracting unit that extracts characters from each of a plurality of different locations in the image data,
a line width judgment unit that
compares line widths of the characters that were extracted by the character extracting unit,
determines whether or not there is a difference in the line widths of the extracted characters,
determines, when there is the difference in the line widths of the characters extracted, that the manuscript is pencil writing, and
determines, when there is not the difference in the line widths of the characters extracted, that the manuscript is not pencil writing, and
a printing-condition-setting change unit that, when the line width judgment unit determines that the manuscript is pencil writing, changes the printing conditions to printing conditions for pencil writing for performing image processing of pencil writing, and causes the printing unit to print the read image data on printing paper according to the changed printing conditions for pencil writing.

2. The image forming apparatus according to claim 1, wherein the character extracting unit extracts characters having the same color from each of a plurality of different locations in the image data.

3. The image forming apparatus according to claim 1, wherein the character extracting unit extracts characters having the same character type from each of a plurality of different locations in the image data.

4. The image forming apparatus according to claim 1, wherein the character extracting unit extracts characters from each of a plurality of different locations in the image data when the manuscript size of the manuscript is size B4 or size A3.

5. The image forming apparatus according to claim 1 comprising:
a platen glass on which the manuscript is placed;
a platen cover that opens or closes the top surface of the platen glass; and
an open/closed detecting unit that detects whether the platen cover is open or closed; wherein
the character extracting unit extracts characters from each of a plurality of different locations in the image data when the open/closed detecting unit detects that the platen cover is open when a copy instruction is received.

6. The image forming apparatus according to claim 1 comprising:
a platen glass on which the manuscript is placed;
a platen cover that opens or closes the top surface of the platen glass; and
an open/closed detecting unit that detects whether the platen cover is open or closed;
wherein
when a copy instruction is received before a preset specified amount of time has elapsed after printing the image data on the printing paper according to printing conditions for pencil writing, and the open/closed detecting unit detects that the platen cover is open when the copy instruction is received, the printing-condition-setting change unit executes a printing operation according to printing conditions for pencil writing without the character extracting unit executing a character extraction process or the line width judgment unit executing a line with judgment operation.

7. The image forming apparatus according to claim 1, wherein the line width judgment unit determines that there is the difference in the line widths of the extracted characters when a difference between a thickest line width among the extracted characters and a narrowest line width among the extracted characters is equal to or greater than a preset threshold value.

* * * * *